Aug. 24, 1943.　　　D. B. BAKER ET AL　　　2,327,850
VEHICLE
Filed March 24, 1941　　　2 Sheets-Sheet 1
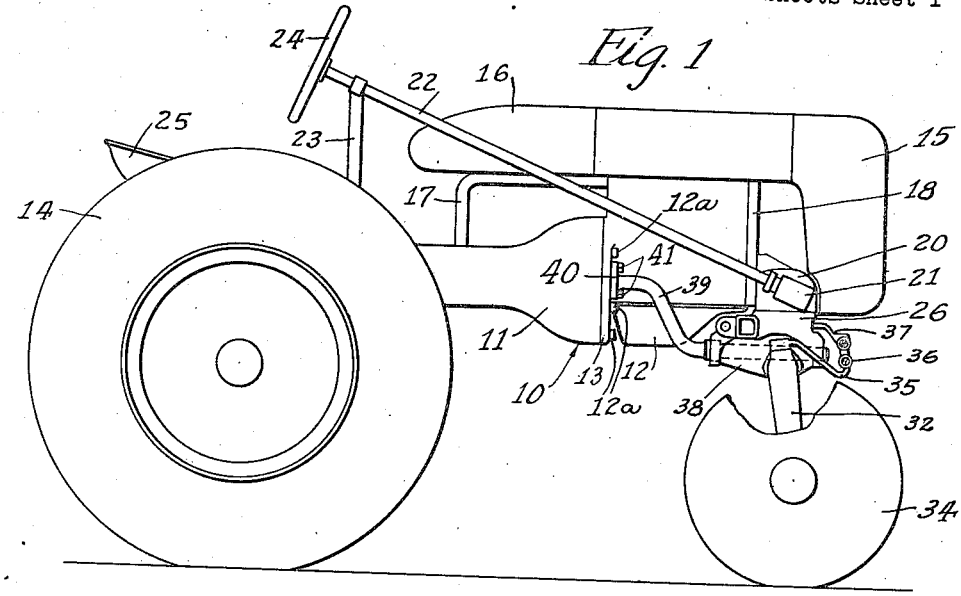
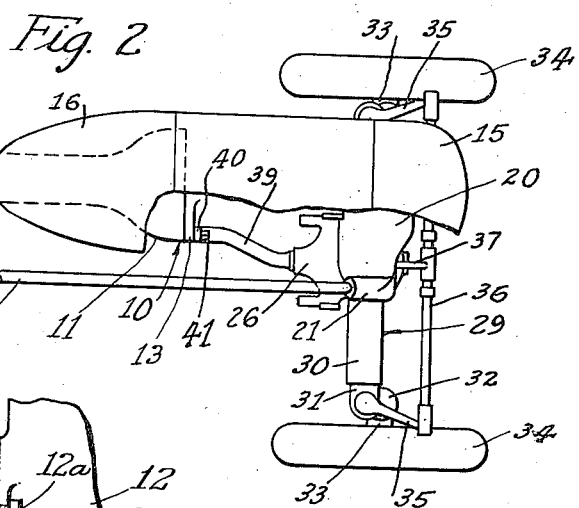
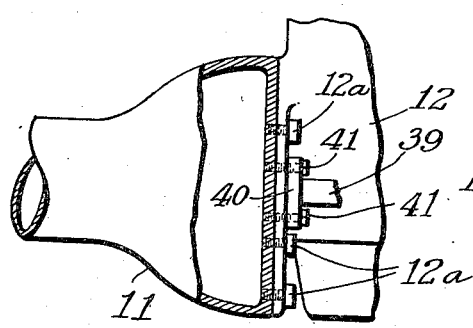
Inventors:
David B Baker
William O. Bechman
By Paul O. Pippel
Atty.

Aug. 24, 1943.    D. B. BAKER ET AL    2,327,850
VEHICLE
Filed March 24, 1941    2 Sheets-Sheet 2

Inventors:
David B. Baker
William O. Bechman
By Paul O. Pippel
Atty.

Patented Aug. 24, 1943

2,327,850

UNITED STATES PATENT OFFICE 2,327,850

VEHICLE

David B. Baker, Riverside, and William O. Bechman, Chicago, Ill., assignors to International Harvester Company, a corporation of New Jersey Application March 24, 1941, Serial No. 384,786

8 Claims. (Cl. 280—111)

This invention relates to a vehicle. More particularly the invention relates to an axle construction for a vehicle of the high clearance type.

The invention contemplates and has for its principal object the provision of a front end construction for an agricultural tractor of the type adapted for use under conditions where the tractor body or frame must be disposed above the ground at a height greater than is usual. In a tractor of this type, the rear end of the body or frame is supported on ground supports which elevate the rear part of the body above its usual level. The rear ground supports may take the form either of wheels of larger diameter or of depending extension housings. The forward end of the body or frame may be similarly supported; that is to say, the front wheels may be of larger diameter or the front axle construction may incorporate extension means for elevating the front end of the body above its usual level. The present invention concerns a construction of the latter type, wherein the front axle structure includes extension means. The axle structure includes a member disposed transversely of the tractor and mounted intermediate its ends on the body on a longitudinal pivot axis to permit oscillation of the axle structure. Each of the outer ends of this transverse member carries a vertical standard having its lower end provided with a spindle on which is journaled a front wheel. The vertical extent of the standards determines the height from the ground at which the forward end of the body will be disposed. Because of the increased length of the wheel standards, it is necessary that the axle structure be adequately braced to relieve the structure of strains not present in the usual low clearance tractor construction.

An important object of the invention is to provide means for bracing the axle structure of a vehicle and particularly the axle structure of a vehicle of the high clearance type.

Another important object is to provide a brace means or support which serves also as a bearing or pivot for mounting the front axle structure on the vehicle for oscillation.

Another object is to provide the brace means in the form of a member having one end secured to the body at a point rearwardly of the axle structure and having its other end provided with a bearing portion including a shoulder on which the axle structure may be pivoted and braced.

Another object is to provide an improved brace means for a high clearance tractor of the type in which the center line between the front wheels of the tractor is laterally offset with respect to the longitudinal center line of the body.

And another object is to provide a brace or supporting means for a tractor having a body of the type comprising a rear body part and a forward body part consisting of the tractor power plant.

The foregoing and other objects will become readily apparent from the following detailed description taken in conjunction with the accompanying sheets of drawings, in which:

Figure 1 is a side elevational view of an agricultural tractor embodying a preferred form of the invention;

Figure 2 is a plan view of the forward portion of the tractor shown in Figure 1, portions of the forward structure of the tractor being broken away;

Figure 5 is an enlarged fragmentary view, partly in section, showing the structure of and the attachment means between the front and rear body parts.

Figure 3:
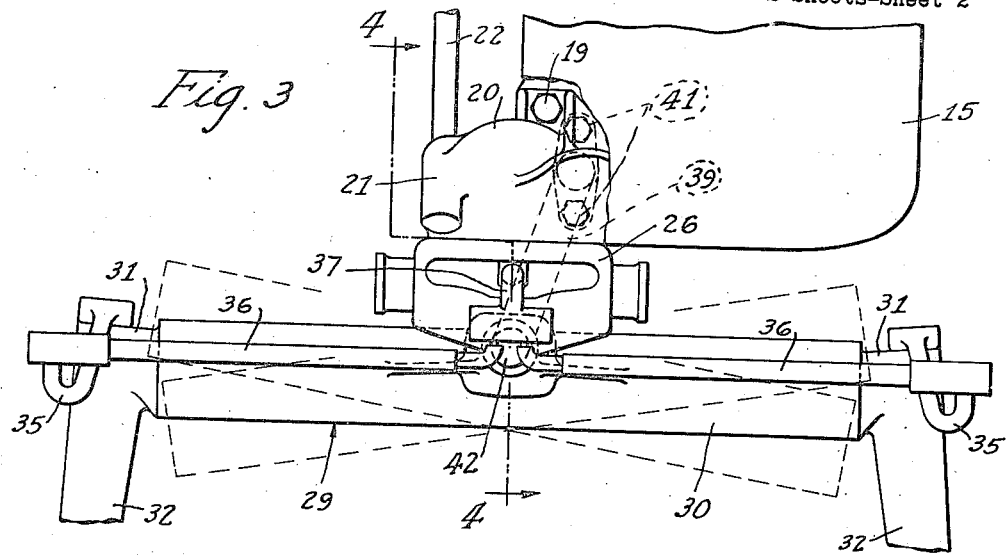
Figure 3 is an enlarged view of a portion of the front end of the tractor, showing the invention in greater detail.

For the purposes of the present disclosure, an agricultural tractor has been chosen as illustrative. As best shown in Figure 1, this tractor comprises a main longitudinal body or frame 10, in the present instance including a rear body or frame part 11 and a forward frame or body part 12, the latter in the form of a power plant or engine of the usual type.

The body or frame parts 11 and 12 are connected together intermediate the ends of the body 10 by a plurality of bolts 12a (see Figure 5), and the power plant 12 includes a laterally extending flanged portion 13 providing a supporting or mounting pad. The rear body part 11 includes the usual axle housings, not shown, which contain suitable driving mechanism for rear ground supports or wheels 14 which support the rear end of the body.

The forward body part 12 includes a radiator and hood structure 15 of a conventional form including a rearwardly disposed fuel tank 16 supported on the rear body part on a supporting member 17.

Figure 4:
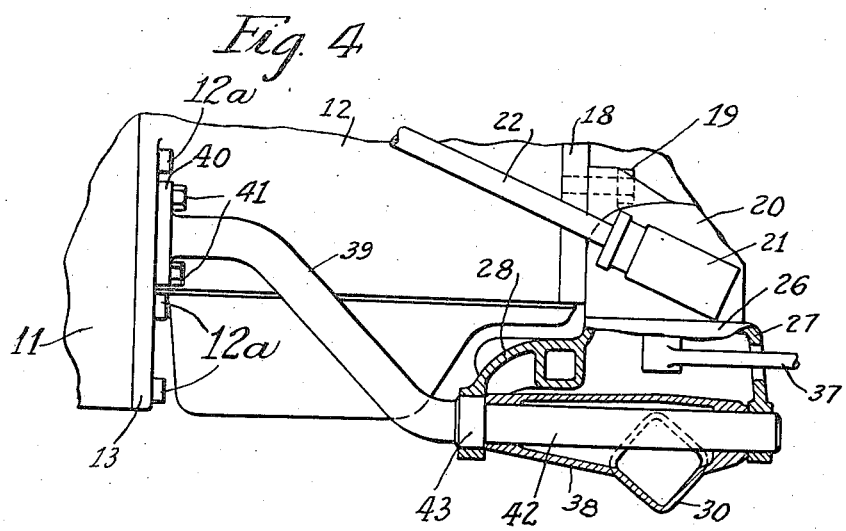
Figure 4 is a partial sectional view, taken substantially along the line 4—4 of Figure 3.

As best shown in Figures 1 and 4, the forward body part or power plant 12 is formed with a transverse flange 18, to which is secured by bolts 19 (only one of which is shown) a transverse bolster structure 20. This structure forms no part of the present invention and is more particularly illustrated in assignee's copending application Serial No. 311,623, filed December 29, 1939, Patent No. 2,262,876, November 18, 1941. The construction is, therefore, only generally illustrated here to the extent necessary for the disclosure of the present invention.

The bolster 20 includes at one side thereof a housing part 21, which houses steering mechanism, not shown, operatively connected to the forward end of a steering rod 22. The steering rod extends upwardly and rearwardly and is supported on the rear body part by a support 23. The steering rod includes a steering wheel 24 immediately ahead of an operator's station 25 located at the rear of the tractor.

To the under side of the bolster structure 20 is secured a second housing 26. This structure is best shown in Figure 4. This housing includes a downwardly extending forward support or bearing element 27 and a longitudinally spaced, rearwardly disposed support or bearing element 28. The bearing elements are apertured on an axis longitudinally of the tractor to provide bearing means for the purpose of the mounting or supporting of a forward axle structure or ground support, generally indicated at 29. The longitudinal axis through the bearing elements 27 and 28 is laterally offset to the right side with respect to the longitudinal center line of the body 10. This structure is best shown in Figures 2 and 3.

The front axle structure 29 consists of a main axle member 30 disposed transversely across the front end of the tractor body. As best shown in Figure 4, the axle 30 is preferably in the form of a tubular element, square in cross section. Each outer end of the element 30 carries a member 31 which may be adjustably fitted within the tubular section of the part 30. Each member 31 includes a downwardly extending vertical standard 32, at the lower end of which is provided a spindle 33, on which is journaled a front wheel 34. The longitudinal axis of the bearing means provided in the housing 26 provides also the center line between the wheels 34 and, as previously stated, this center line is laterally offset with respect to the center line of the tractor body 10. The adjustability between the member 30 and the member 31 provides for variations in the tread of the front wheels 34.

Each of the standards 32 includes at its upper end a forwardly extending steering arm 35. A jointed tie-rod 36 interconnects the steering arms 35 and is connected at its intermediate portion by suitable means to a steering member 37 connected through the steering mechanism in the housing 21 to the steering rod 22. The arrangement between the steering member 37 and the housings 21 and 26 is best shown in Figures 3 and 4.

An intermediate portion of the axle element 30 includes bearing means in the form of a longitudinal sleeve 38 apertured on a longitudinal axis. The sleeve 38 is preferably welded to the member 30. The axle structure is disposed at the forward end of the tractor with the sleeve 38 disposed between and in alinement with the apertured bearing elements or ears 27 and 28 on the housing 26. A support or brace means in the form of a longitudinally extending brace member 39 serves the dual purpose of connecting the axle structure to the body and of bracing the axle structure to an intermediate portion of the body. As best shown in Figure 4, the brace member 39 has at its rearward end a flange 40 secured by bolts 41 to the flange 13 at the rear end of the power plant 12. The location of the flange or part 13 is remote from the forward end of the body 10. The brace 39 extends longitudinally along one side of the body and its forward end is provided as a bearing portion 42, which passes through the apertured bearing elements 27 and 28 and through the apertured bearing sleeve 38 on the axle structure 29. The aperture in the rear bearing element 28 is slightly larger than the aperture in the front bearing element and is larger than the bore or aperture through the sleeve 38. This enlarged aperture accommodates a shoulder 43 on an intermediate portion of the brace member 39, and the shoulder abuts the rearward portion of the sleeve 38. In this fashion the front axle structure 29 is connected to the body 10 by the simple means of the brace member 39, which member is connected to the body solely by the bolts 41. Additional means for connecting the brace element 39 to either the housing 26 or the axle structure 29 are unnecessary according to the preferred form of the invention illustrated.

From the foregoing description it will be seen that an improved front end construction has been provided for a vehicle, and particularly for an agricultural vehicle of the high clearance type. The brace 39, as previously stated, provides means for pivoting the front axle structure to the tractor for oscillation about a longitudinal axis. According to the preferred form of the invention illustrated, this longitudinal axis is offset laterally with respect to the longitudinal axis of the tractor body. The attaching flange or pad 13 provides a convenient and simple location for the provision of means attaching the brace 39 to an intermediate portion of the tractor body. The shape of the brace 39 is such as to enable the brace to be disposed closely adjacent the forward portion of the tractor body, and the brace does not in any way extend below the body. In this manner a suitable brace means is provided which does not interfere with the operation of the tractor as a high clearance tractor. The bearing portion 42 of the member 39 has a comparatively large longitudinal extent and provides an adequate surface for supporting the front axle structure 29, the length of this surface providing suitable support against twisting of the front axle structure about an axis transversely across the front of the tractor through the axle element 30.

Certain other objects and important features of the invention will be recognized by those skilled in the art. It is to be understood that the foregoing disclosure relates to only a preferred embodiment of the invention and that numerous modifications and alterations may be made therein without departing from the spirit and scope of the invention as defined in the appended claims.

What is claimed is:

1. In a vehicle, the combination of a longitudinal main frame having a rear part and a front part, a support carried on the front part, an arched axle structure including an upper portion disposed transversely of the front part adjacent the support, and a brace member connected at one end to the frame adjacent the rear part and extending generally alongside the frame toward the support, said member including a pivot portion connecting the support and the upper portion of the axle structure and providing a bearing on which the axle structure may oscillate with respect to the support.

2. In a vehicle, the combination of a longitudinal main frame having a rear body part and a forwardly disposed power plant, a support carried on the power plant, an axle structure disposed transversely of the power plant adjacent the support, and a brace member connected at one end to the rear body part and extending generally alongside and independently of the power plant toward the support, said member including a pivot portion connecting the support and axle structure and providing a bearing on which the axle structure may oscillate with respect to the support.

3. In a vehicle, the combination of a longitudinal main frame having a rear body part and a front body part interconnected intermediate the ends of the body, one of said parts including a mounting portion adjacent the point of connection, bearing means on the front body part at a point spaced longitudinally from the mounting portion, a front axle structure disposed transversely of the frame at the bearing means and including a bearing portion cooperating with the aforesaid bearing means, pivot means connecting said bearing portion and bearing means and providing a pivot for mounting the axle structure on the front body part, and means connecting the pivot means to the aforesaid mounting portion.

4. In a vehicle, the combination of a longitudinal body including a front part and a rear part connected together, a front axle structure at the front end of the front body part and including a pair of transversely spaced wheels, the center line between the wheels being laterally offset with respect to the center line of the body, a support secured to the body adjacent the point of connection of the body parts and having a portion disposed in a vertical plane passed through the center line between the front wheels, and means connecting said portion of the support and the front axle.

5. In a vehicle, the combination of a longitudinal body including a front part and a rear part connected together, an axle structure at one end of one of the body parts and including a pair of transversely spaced wheels, the center line between the wheels being laterally offset with respect to the center line of the body, a support secured to the body adjacent the point of connection of the body parts and having a portion disposed in a vertical plane passed through the center line between the wheels, and means connecting said portion of the support and the front axle.

6. In a vehicle, the combination of a longitudinal body, a brace member extending longitudinally of the body along a line paralleling and offset laterally with respect to the longitudinal center line of the body, means connecting one end of the brace member to the body, a second means connecting the other end of the brace member to the body at a point longitudinally spaced from the first means, a ground support for the body, and means connecting the ground support and brace member at a point remote from one of the aforesaid mounting means.

7. In a high-clearance tractor, the combination of a longitudinal body, a brace member extending longitudinally of the body along a line offset laterally with respect to the longitudinal center line of the body, means connecting one end of the brace member to the front portion of the body, a second means connecting the other end of the brace member to an intermediate portion of the body, an arched front axle structure disposed transversely across the front of the body to space the body at a substantial distance from the ground, and means connecting the axle structure and brace member at a point closely adjacent the connecting means at the front of the body.

8. In a vehicle, a running gear frame, a bolster structure depending from said frame and including a spindle-attaching means spaced downwardly from said frame, a brace member for said bolster structure, said brace member including a fore and aft extending spindle portion secured in said spindle-attaching means and also including a brace portion connected with said frame at a position spaced lengthwise of the frame from said spindle-attaching means, and an axle structure extending transversely of the frame and having an intermediate part pivoted on said spindle portion as an expedient for connection with the bolster structure.

DAVID B. BAKER.
WILLIAM O. BECHMAN.